United States Patent [19]
Virtanen

[11] Patent Number: 4,976,855
[45] Date of Patent: Dec. 11, 1990

[54] OIL COLLECTING VESSEL

[76] Inventor: Kalervo Virtanen, Metsäpekkalantie 2, 15610 Lahti, Finland

[21] Appl. No.: 339,185

[22] Filed: Apr. 14, 1989

[51] Int. Cl.$^5$ .............................................. E02B 15/04
[52] U.S. Cl. .................................. 210/242.3; 210/923
[58] Field of Search ...................... 210/776, 242.3, 923

[56] References Cited
U.S. PATENT DOCUMENTS

| | | | |
|---|---|---|---|
| 3,716,142 | 2/1973 | Bianchi | 210/776 |
| 3,731,813 | 5/1973 | Tipton | 210/242.3 |
| 4,196,087 | 4/1980 | Gordon | 210/923 |
| 4,391,707 | 7/1983 | Gordon | 210/242.3 |

FOREIGN PATENT DOCUMENTS 57996 7/1980 Finland.

*Primary Examiner*—Ivars Cintins
*Attorney, Agent, or Firm*—Scully, Scott, Murphy & Presser

[57] ABSTRACT

An oil collecting vessel for removing oil from the surface of water, comprising at least two oil booms arranged in front of the vessel in V-shape, the oil booms comprising buoyant screwlike draw booms arranged to rotate so as to draw surface water and oil into a receiver provided in the vessel, simultaneously displacing the vessel forward. The oil booms further comprise boundary booms provided in parallel with the draw booms so as to lead the surface water displaced by the draw booms into the receiver in the vessel; whereby each oil boom comprises a number of draw booms connected in series by means of universal joints, the draw flanges of the outermost draw booms being larger than those of the other draw booms, so that the vessel is steerable and the opening direction of the oil booms adjustable by operating the outermost draw boom of one of the oil booms at a speed different from that of the outermost draw boom of the other oil boom.

3 Claims, 1 Drawing Sheet

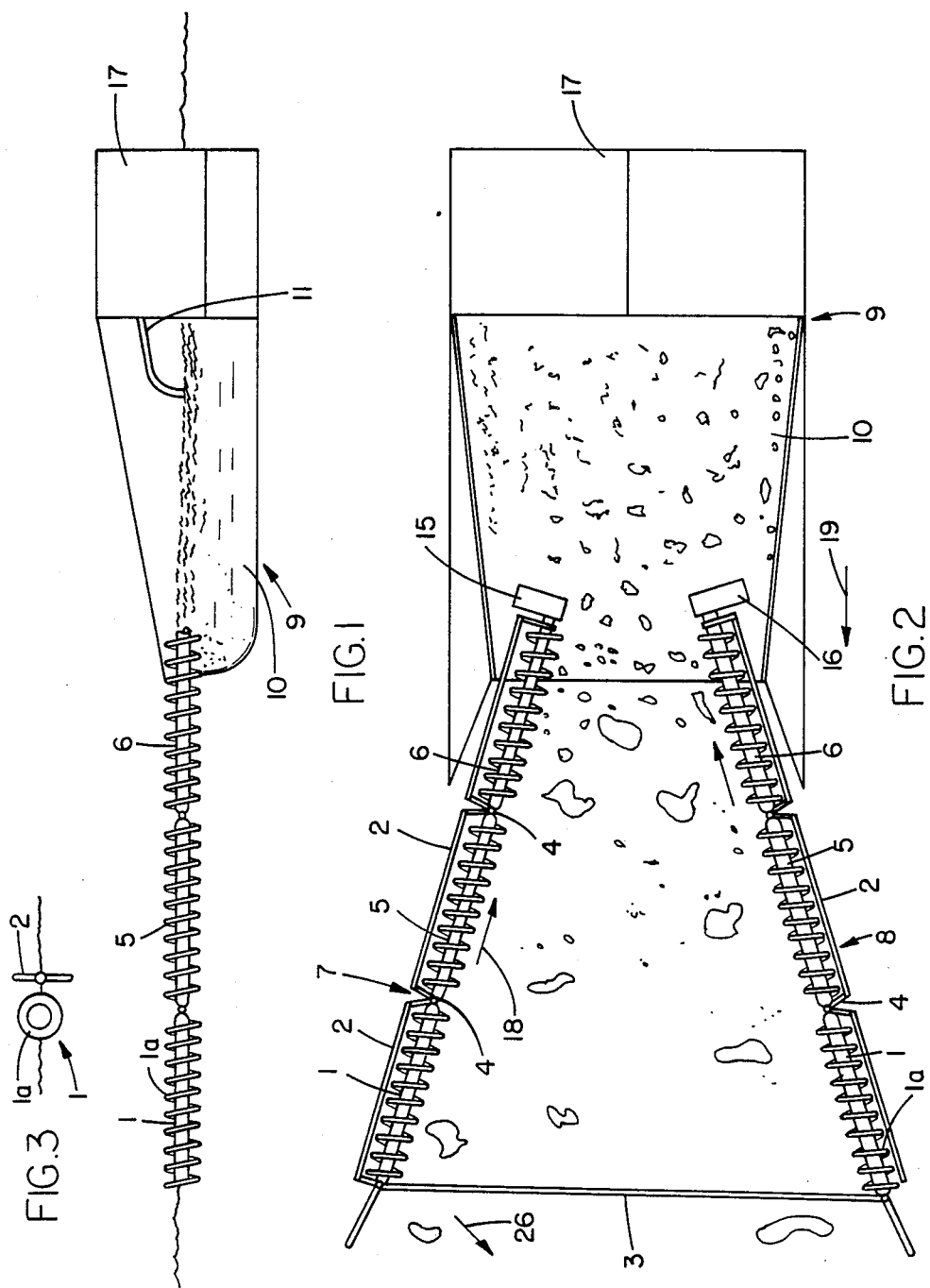

OIL COLLECTING VESSEL

FIELD OF THE INVENTION

The invention relates to an oil collecting vessel for removing oil from the surface of water.

BACKGROUND OF THE INVENTION

Finnish Patent Specification 57996 discloses an oil collecting vessel comprising two oil booms arranged in V-shape. The booms are provided with power shafts for rotating rotors attached thereto, whereby the rotors displace oil from beside the booms in the sideward direction to the path of travel of the vessel, wherefrom a conveyor band positioned in front of the vessel passes the oil into the vessel. This vessel cannot be used for collecting oil from the surface of water containing ice blocks, because the rotors are not capable of displacing the ice blocks but are damaged. The rotors do not increase the efficiency of the oil collecting process to any greater extent, and part of the oil escapes under the booms so that the conveyor band will not catch it.

U.S. Pat. No. 4,196,087 discloses an oil collecting device, wherein the flow of oil-containing surface water into the collecting gates of the device is made more efficient by positioning screwlike booms radially around the device, whereby the device can be displaced by operating these booms selectively. Such a radial structure, however, is not suitable for use in large independently operated vessels.

SUMMARY OF THE INVENTION

The object of the invention is to provide an oil collecting vessel which is also suited for the collecting of oil from water containing ice blocks and in which screwlike draw booms are utilized more efficiently than previously both for displacing oil and for moving the collecting vessel.

This object is achieved by means of an oil collecting vessel according to the invention, comprising at least two oil booms arranged in front of the vessel in V-shape, the oil booms comprising buoyant screwlike draw booms arranged to rotate so as to draw surface water and oil into a receiver provided in the vessel, simultaneously displacing the vessel forward; and boundary booms provided in parallel with the draw booms so as to lead the surface water displaced by the draw booms into the receiver in the vessel; whereby each oil boom comprises a number of draw booms connected in series by means of universal joints, the draw flanges of the outermost draw booms being larger than those of the other draw booms, so that the vessel is steerable and the opening direction of the oil booms is adjustable by operating the outermost draw boom of one of the oil booms at a speed different from that of the outermost draw boom of the other oil boom.

While rotating at equal speed, the screwlike draw booms at the ends of the long oil booms displace the vessel efficiently forward and simultaneously pass oil-containing surface water towards the receiver provided in the vessel. The boundary booms provided at the outer sides of the draw booms prevent the flow of surface water past the booms, thus improving the efficiency of the collecting process. Since the screws in the outermost draw booms of the oil booms are larger than in the other draw booms, the rotation of the outermost draw boom of one of the oil booms at a higher speed than the other tends to create a lever effect which causes this oil boom to be displaced towards the other, simultaneously turning the opening angle of the oil boom structure and the vessel, too, if the turning of the booms with respect to the vessel is prevented.

The long oil boom formed by short boom sections interconnected with universal joints follows better the motion of waves and the swell of the sea, thus improving the efficiency of the oil collecting process and the strength of the oil boom under difficult conditions.

The outer ends of the oil booms are preferably interconnected by means of a wire rope adjustable in length so that the opening angle of the oil boom can be adjusted.

BRIEF DESCRIPTION OF THE DRAWINGS

The invention will be described in more detail with reference to the attached drawing, wherein FIG. 1 is a sectional side view of an oil collecting vessel according to one embodiment of the invention;

FIG. 2 is a top view of the oil collecting vessel of FIG. 1; and

FIG. 3 is a cross-sectional view of an oil boom.

DESCRIPTION OF THE PREFERRED EMBODIMENT

FIGS. 1-3 show one specific oil collecting vessel according to the invention. The vessel comprises a body 9 having a receiver 10 open at the top. Two buoyant oil booms 7 and 8 are positioned in front of the vessel at the front corners of the receiver 10. The booms protrude from the vessel obliquely forward, forming a V-shaped boom structure tapering towards the receiver 10, thus leading oil-containing surface water into the receiver. Each boom 7 and 8 is formed by three screwlike draw booms 1, 5 and 6 interconnected by means of two universal joints positioned therebetween. A boundary boom 2 is provided in parallel with each draw boom section 1, 5 and 6. The boundary boom is equal in length with the respective draw boom section and secured at the universal joints 4. Further, the boundary boom is preferably a substantially vertical plate having a height at least equal to the diameter of the draw boom 1, 5 or 6. A drive motor 15 or 16 is provided at the end of the draw boom 6 closest to the vessel for the oil boom 7 and 8, respectively, for rotating all the draw booms 1, 5 and 6 of each oil boom at an equal speed.

The distance between the oil booms 7 and 8, that is, the opening angle of the booms, can be adjusted by means of a wire rope 3 or the like interconnecting the outer ends of the oil booms and adjustable in length. The wire rope 3 preferably goes from the vessel along the oil boom 7 to its end and therefrom via the end of the oil boom 8 along the boom 8 back to the vessel. In this way, the length of the wire rope 3 can be adjusted by drive means (not shown) provided in the vessel.

While the draw booms 1, 5 and 6 rotate and displace surface water towards the receiver 10 of the vessel in the direction of the arrow 18, their rotation tends to displace the vessel forward in the direction of the arrow 19. This tendency is increased by providing the outermost draw booms 1 of the oil booms 7 and 8 with screw flanges larger than those of the other draw booms 5 and 6, that is, the diameter of the draw booms 1 is larger. Furthermore, when the draw booms of the oil boom 7, for instance, are rotated at a speed higher than that of the draw booms of the oil boom 8, the draw boom 1 of the oil boom 7 produces a greater tractive force on this side of the vessel, whereby the vessel tends to turn in the direction of the arrow 26. In this way the vessel can be easily steered by varying the relative speeds of the draw booms of the oil booms 7 and 8.

The boundary booms 2 at the outer sides of the oil booms 7 and 8 prevent the escape of surface water past the booms to the sides of the vessel, leading the surface water into the receiver over the low front edge thereof.

The oil floating on the surface of the water contained in the receiver 10 is pumped into a recovery receiver 17 by suitable means, such as a pipe 11 provided at the back of the vessel.

The figures and the description related thereto are only intended to illustrate the invention. In its details, the present invention way vary within the scope of the attached claims.

I claim:

1. An oil collecting apparatus for removing oil from the surface of water, comprising: a vessel, at least two oil booms arranged in front of the vessel in V-shaped, the oil booms comprising buoyant screwlike draw booms arranged to rotate so as to draw surface water and oil into a receiver provided in the vessel, simultaneously displacing the vessel forward; and boundary booms provided in parallel with the draw booms so as to lead the surface water displaced by the draw booms into the receiver in the vessel; wherein each of said draw booms comprises a plurality of draw boom segments connected in series by universal joints, draw flanges in each of the draw boom segments, the draw flanges in the outermost draw boom segment of each draw boom being larger than those of the other draw boom segments, so that the vessel is steerable and the opening direction of the oil booms is adjustable by operating the outermost draw boom segment of one of the oil booms at a speed different from that of the outermost draw boom segment of the other oil boom.

2. An oil collecting apparatus according to claim 1, wherein the outer ends of the oil booms are interconnected by a wire rope adjustable in length, whereby the opening angle of the oil booms can be adjusted.

3. An oil collecting apparatus for removing oil from the surface of water, comprising: a vessel, at least two oil booms arranged in front of the vessel in V-shaped, the oil booms comprising buoyant screwlike draw booms arranged to rotate so as to draw surface water and oil into a receiver provided in the vessel, simultaneously displacing the vessel forward; and boundary booms provided in parallel with the draw booms so as to lead the surface water displaced by the draw dooms into the receiver in the vessel; wherein each of said draw booms comprises a plurality of draw boom segments connected in series by universal joints.

* * * * *

UNITED STATES PATENT AND TRADEMARK OFFICE
CERTIFICATE OF CORRECTION

PATENT NO. : 4,976,855

DATED : December 11, 1990

INVENTOR(S) : Kalervo Virtanen

It is certified that error appears in the above-identified patent and that said Letters Patent is hereby corrected as shown below:

Column 3, line 20, Claim 1: "V-shaped" should read as --V-shape--

Column 4, line 17, Claim 3: "V-shaped" should read as --V-shape--

Column 4, line 23, Claim 3: "dooms" should read as --booms--

Signed and Sealed this

Twenty-first Day of April, 1992

*Attest:*

HARRY F. MANBECK, JR.

*Attesting Officer*  *Commissioner of Patents and Trademarks*